(12) United States Patent
Hsu et al.

(10) Patent No.: US 11,624,221 B1
(45) Date of Patent: Apr. 11, 2023

(54) HINGE

(71) Applicant: FOSITEK CORPORATION, New Taipei (TW)

(72) Inventors: An-Szu Hsu, New Taipei (TW); Wei-Chieh Chen, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 17/703,244

(22) Filed: Mar. 24, 2022

(30) Foreign Application Priority Data

Dec. 9, 2021 (TW) .................................. 110146028

(51) Int. Cl.
| | | |
|---|---|---|
| *E05D 3/06* | (2006.01) | |
| *E05D 1/04* | (2006.01) | |
| *E05D 3/12* | (2006.01) | |
| *E05D 3/18* | (2006.01) | |

(52) U.S. Cl.
CPC .............. *E05D 3/122* (2013.01); *E05D 3/18* (2013.01); *E05Y 2900/606* (2013.01)

(58) Field of Classification Search
CPC ........ G06F 1/16; G06F 1/1616; G06F 1/1681; G06F 1/166; G06F 1/1679; H04M 1/022; H04M 1/0214; H04M 1/0216; H04M 1/0222; H05K 5/0226; F16M 11/10; E05D 11/00; E05D 11/1021; E05D 11/1078; E05D 11/082; E05D 3/14; E05D 3/18; E05D 3/122; E05D 3/12; E05D 3/16; E05D 3/06; E05D 3/32; E05D 15/28; E05D 15/30; E05D 15/32; E05D 15/40; E05D 1/04; E05D 2001/045; E05Y 2900/606; E05Y 2900/60; E05Y 2201/716; E05Y 2201/722; Y10T 16/542; Y10T 16/543; Y10T 16/544; Y10T 16/5443; Y10T 16/5445; Y10T 16/5448; Y10T 16/545; Y10T 16/54038
See application file for complete search history.

(56) References Cited

U.S. PATENT DOCUMENTS

| | | | | |
|---|---|---|---|---|
| 10,036,188 | B1 * | 7/2018 | Yao ....................... | G06F 1/1681 |
| 10,352,354 | B1 * | 7/2019 | Hsu ....................... | G06F 1/1641 |
| 10,664,021 | B1 * | 5/2020 | Hsu ....................... | H04B 1/3888 |
| 11,243,578 | B2 * | 2/2022 | Torres ................... | G06F 1/1616 |
| 2020/0097051 | A1 * | 3/2020 | Liu ........................ | G06F 1/1681 |
| 2020/0392983 | A1 * | 12/2020 | Chang ................... | G06F 1/1681 |
| 2021/0173449 | A1 * | 6/2021 | Yao ....................... | G06F 1/1652 |
| 2021/0250431 | A1 * | 8/2021 | Park ....................... | G06F 1/1652 |

FOREIGN PATENT DOCUMENTS

CN 214661469 U * 11/2021

* cited by examiner

*Primary Examiner* — Chuck Y Mah
(74) *Attorney, Agent, or Firm* — Burris Law, PLLC

(57) ABSTRACT

A hinge includes: a base seat; two slide seats that are mounted on the base seat, that are movable between an inner position and an outer position, and that each have a slide rail portion; two rotary members that each have a slide portion being in sliding contact with the slide rail portion of a respective slide seat, and that are respectively rotatable relative to the slide seats; and two coupling mechanisms that are connected between the rotary members and the slide seats, such that rotations of the rotary members drive the slide seats to move between the inner position and the outer position. A distance between the slide seats decreases when the slide seats move from the outer position to the inner position.

10 Claims, 12 Drawing Sheets

HINGE

CROSS-REFERENCE TO RELATED APPLICATION

This application claims priority of Taiwanese Patent Application No. 110146028, filed on Dec. 9, 2021.

FIELD

The disclosure relates to a hinge, and more particularly to a hinge for use with a foldable electronic device having a flexible display.

BACKGROUND

In recent years, flexible displays have been increasingly applied to foldable electronic devices. A conventional foldable electronic device generally includes two casings, a flexible display that is disposed on the casings, and at least one hinge that is mounted between the casings and that enables the casings to be folded and unfolded relative to each other. The hinge has a base member, and two rotating members that are mounted to the base member and that are respectively connected to the casings. The rotating members are configured to rotate respectively about two rotation axes relative to the base member via sliding engagement between a slide block and a slide groove. However, during the folding or unfolding process of such conventional foldable electronic device, when the casings are moved past a certain position (e.g., where an angle formed between the casings is 150 degrees), the flexible display is subjected to a stretching or compressing force, which can potentially damage or reduce the lifespan of the flexible display.

SUMMARY

Therefore, the object of the disclosure is to provide a hinge that can alleviate the drawback of the prior art.

According to the disclosure, a hinge includes a base seat, two slide seats, two rotary members, and two coupling mechanisms.

The slide seats are mounted on the base seat and are arranged along a first axis that extends in a first direction. The slide seats are movable relative to each other along the first axis between an inner position and an outer position. A distance between the slide seats when the slide seats are at the inner position is shorter than that when the slide seats are at the outer position. Each slide seat has a slide rail portion that extends about a rotary axis. The rotary axes about which the slide rail portions of the slide seats respectively extend are parallel to each other in the first direction and extend in a second direction that is perpendicular to the first direction.

Each of the rotary members has a slide portion that is in sliding contact with the slide rail portion of a respective one of the slide seats. The rotary members are respectively rotatable relative to the slide seats and are respectively rotatable about the rotary axes.

The coupling mechanisms are connected respectively to the rotary members and are connected respectively to the slide seats, such that rotations of the rotary members drive the slide seats to move between the inner position and the outer position.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
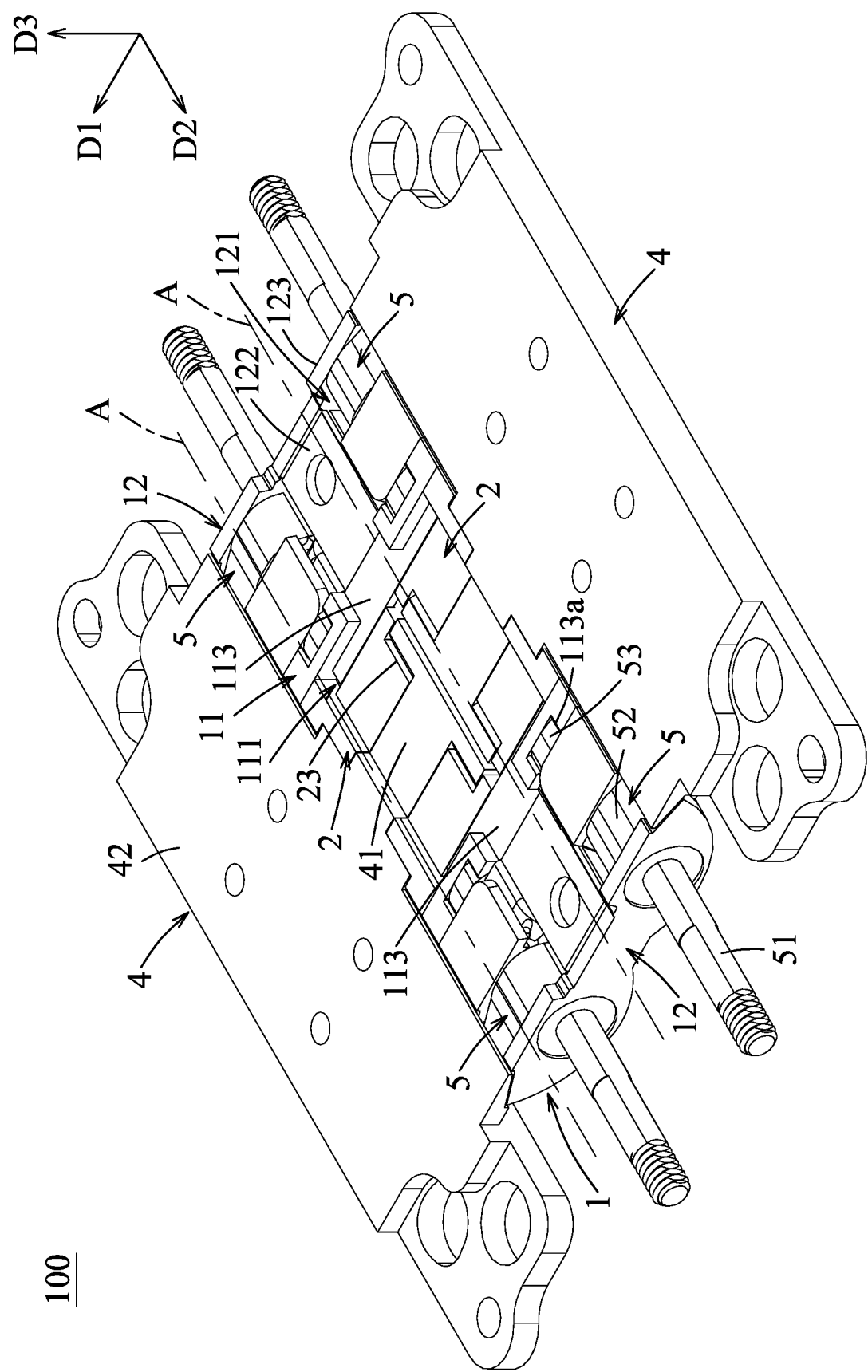
FIG. 1 is a perspective view of an embodiment of a hinge according to the present disclosure.
Figure 2:
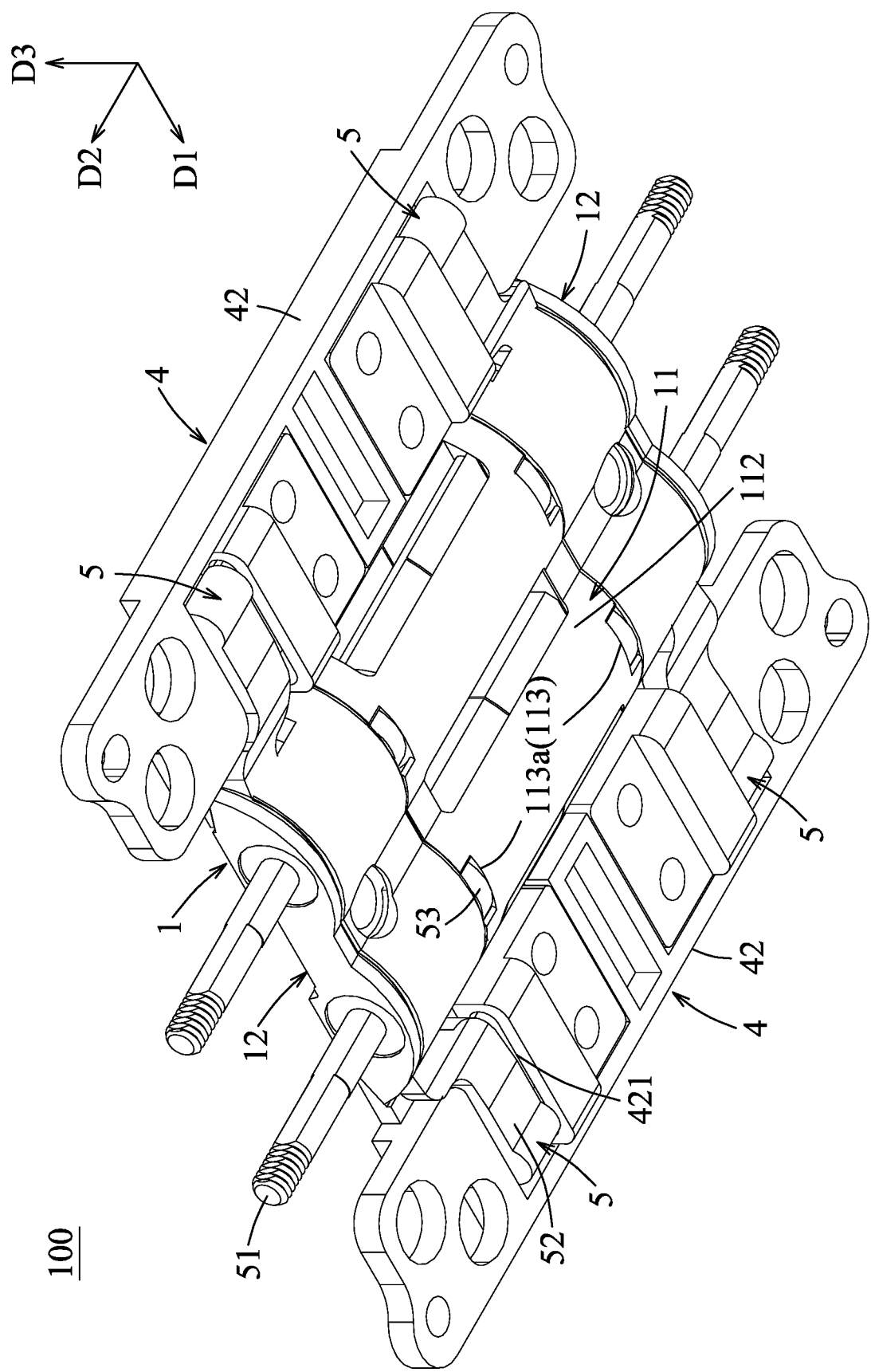
FIG. 2 is another perspective view of the embodiment from a different angle.
Figure 3:
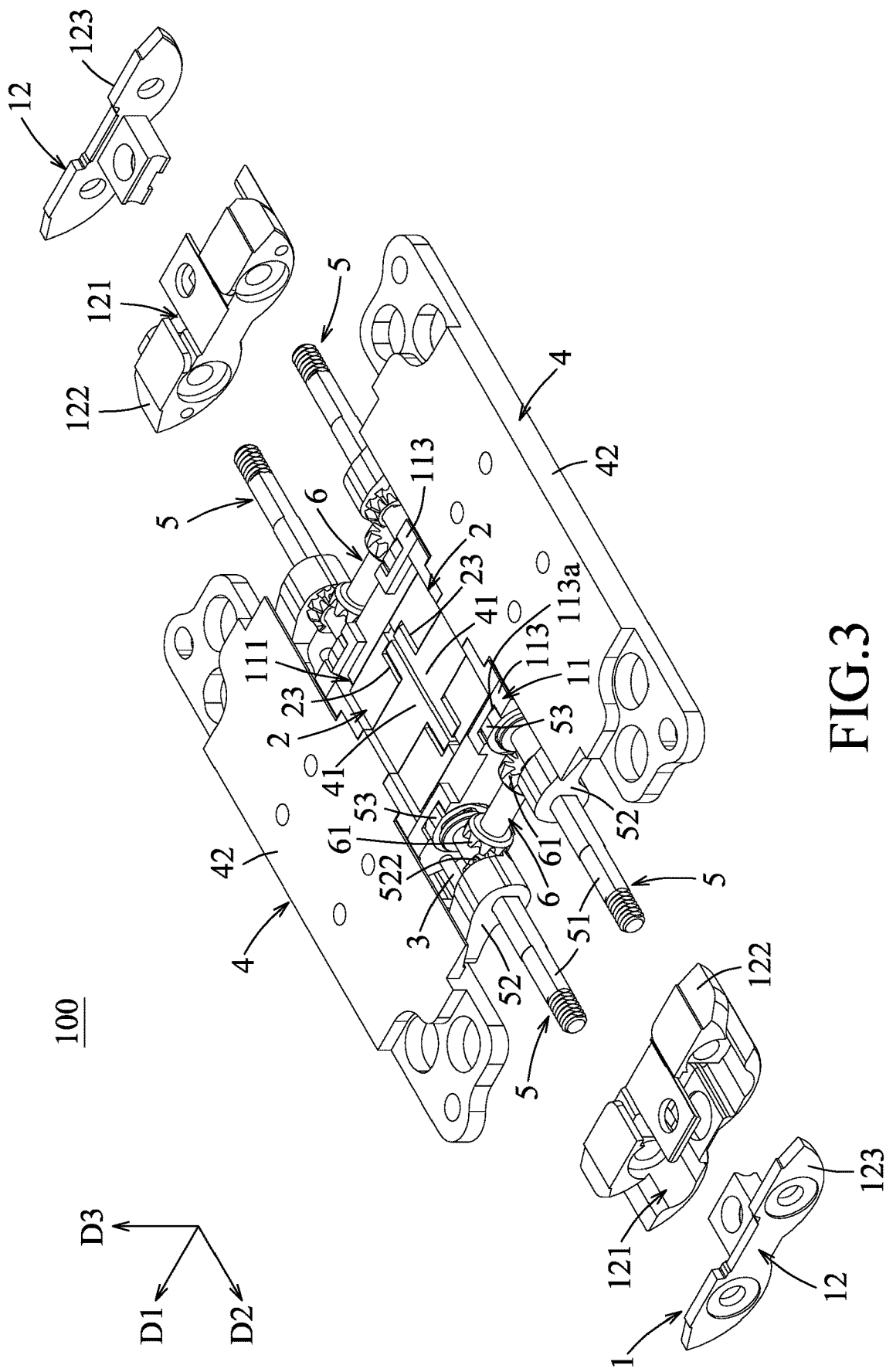
FIG. 3 is a partially exploded perspective view of the embodiment, based on FIG. 1.
Figure 4:
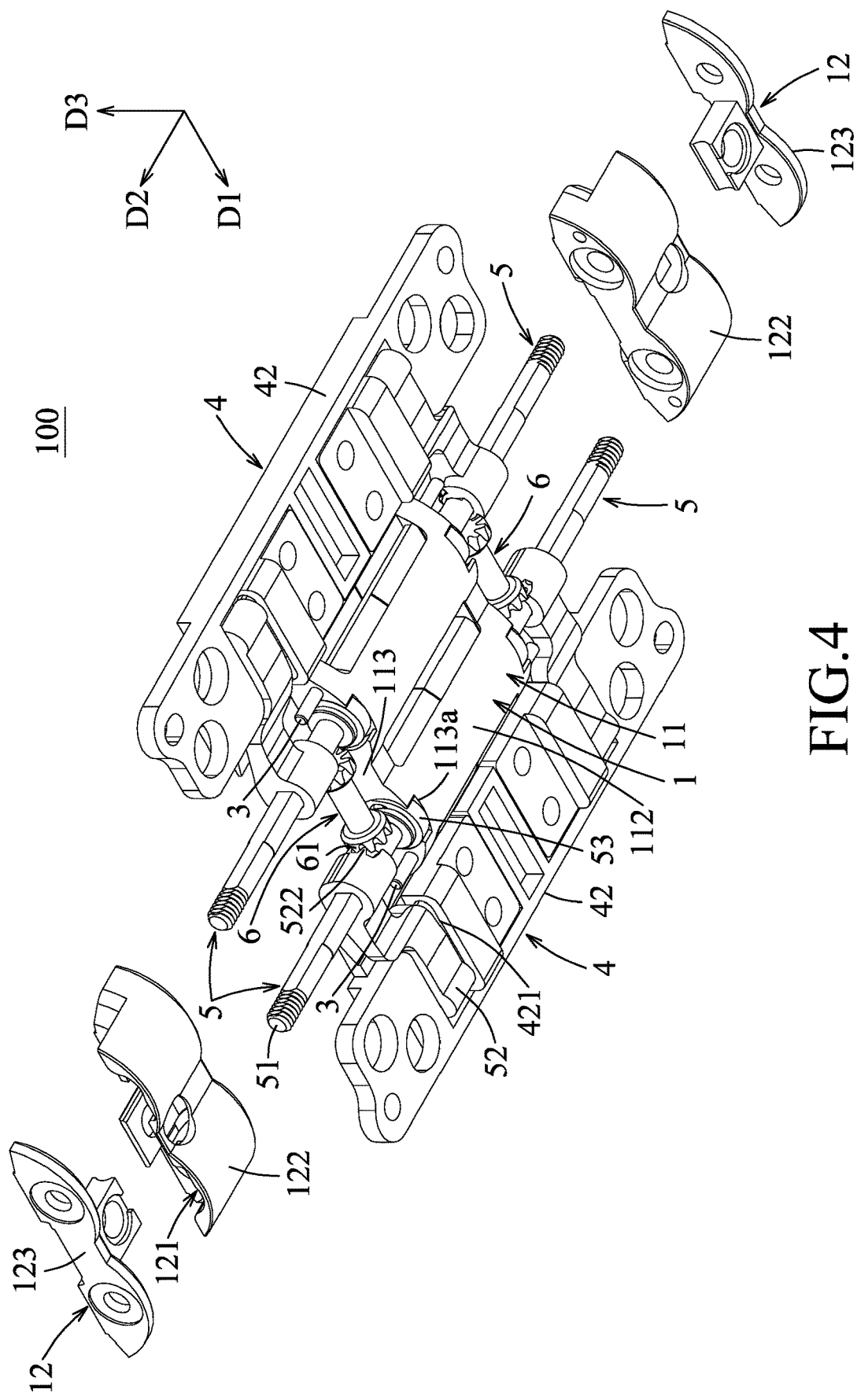
FIG. 4 is another partially exploded perspective view of the embodiment, based on FIG. 2.
Figure 5:
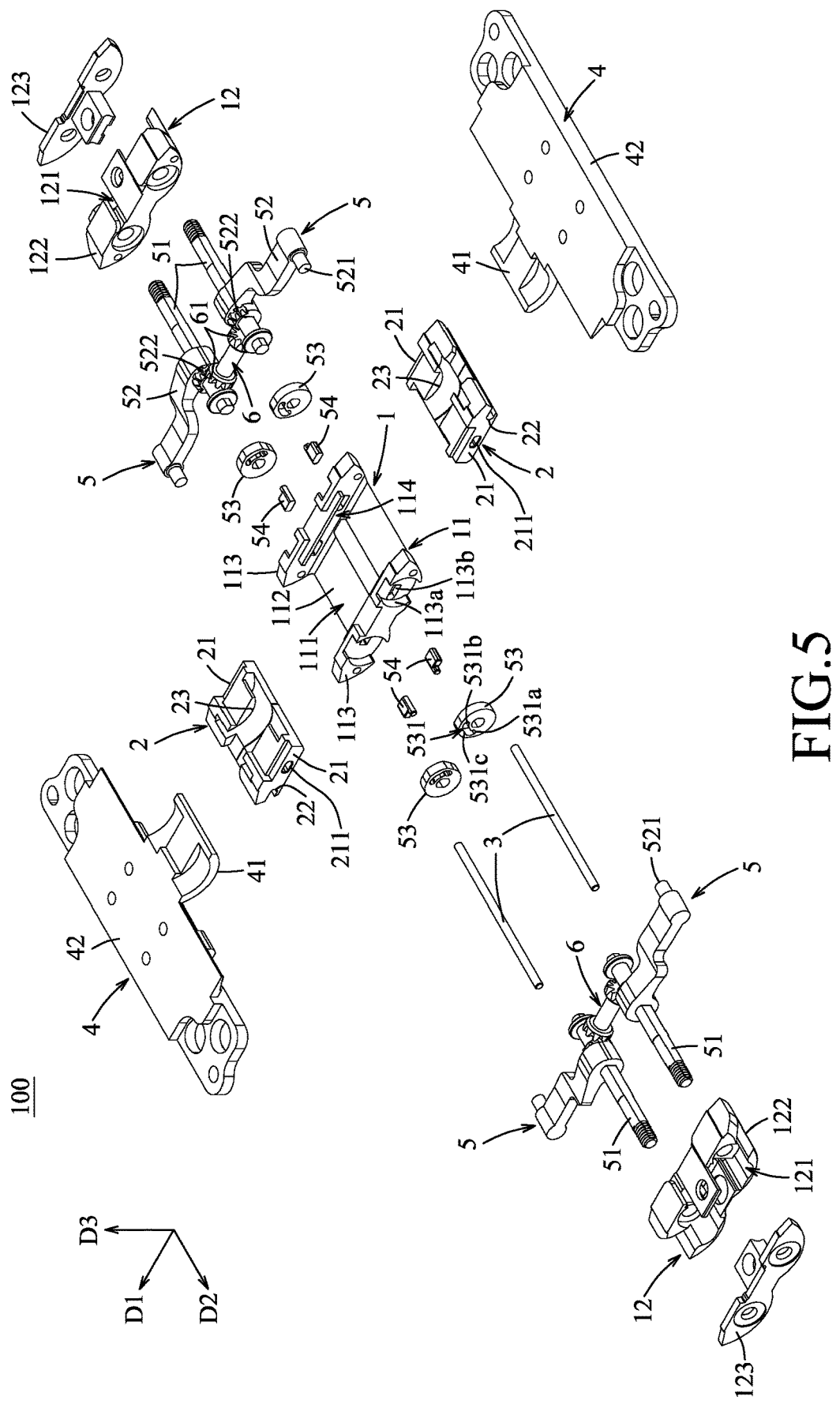
FIG. 5 is a fully exploded perspective view of the embodiment, based on FIG. 1.

Referring to FIGS. 1 to 4, an embodiment of a hinge 100 according to the disclosure includes a base seat 1, two slide seats 2, two limit rods 3, two rotary members 4, four coupling mechanisms 5 and two gear members 6. However, the limit rods 3 and the gear members 6 are not limited to the present configurations, and may be omitted in variations of the present embodiment.

The base seat 1 includes a first unit 11, and two second units 12 that are disposed at opposite ends of the first unit 11. The slide seats 2 are mounted on the first unit 11 of the base seat 1, and are arranged along a first axis that extends in a first direction (D1). The slide seats 2 are movable relative to each other along the first axis between an inner position (see FIG. 8) and an outer position (see FIG. 10). A distance between the slide seats 2 when the slide seats 2 are at the inner position is shorter than that when the slide seats 2 are at the outer position.

Specifically, referring to FIG. 1 and FIGS. 3 to 6, the first unit 11 of the base seat 1 includes a base segment 112, and two side segments 113 that are connected respectively to opposite ends of the base segment 112 in a second direction (D2) perpendicular to the first direction (D1), and that cooperate with the base segment 112 to define a receiving space 111 thereamong. Each of the side segments 113 is formed with two mounting slots 113a, two through slots 113b and a guide recess 114. The mounting slots 113a of each of the side segments 113 are arranged along the first direction (D1), and face away from the receiving space 111 of the first unit 11. The through slots 113b of each of the side segments 113 are arranged along the first direction (D1), and each extend along the second direction (D2) such that each of the through slots 113b spatially intercommunicates a respective one of the mounting slots 113a with the receiving space 111 of the first unit 11. The guide recess 114 of each of the side segments 113 is elongated in the first direction (D1), and is in spatial communication with the receiving space 111. The two guide recesses 114 are opposite to each other along the second direction (D2). Each of the second units 12 of the base seat 1 includes a first component 122 and a second component 123 that cooperatively define a receiving slot 121.

The slide seats 2 are disposed movably in the receiving space 111 of the first unit 11. Each of the slide seats 2 has two guide protrusions 21, a rod groove 22 and a slide rail portion 23.

The guide protrusions 21 of each of the slide seats 2 are opposite to each other along the second direction (D2), and each of the guide protrusions 21 is elongated along a second axis that is parallel to the first axis, is formed with a block slot 211 (see FIG. 5, only two are shown), engages the guide recess 114 of a corresponding one of the side segments 113 of the first unit 11 (i.e., each of the guide recesses 114 is engaged with two of the guide protrusions 21), and is slidable along the second axis. The rod grooves 22 of the slide seat 2 extend along the second direction (D2), and are respectively formed in opposite outer sides of the slide seats 2 that are opposite in the first direction (D1). The slide rail portions 23 of the slide seats 2 respectively extend about two rotary axes (A) that are parallel to each other in the first direction (D1), and that extend in the second direction (D2). It should be noted that, in the present embodiment, each of the rotary axes (A) is disposed above the respective slide seat 2 along a third direction (D3) that is perpendicular to the first and second directions (D1, D2) (see FIG. 8).

The limit rods 3 are connected between the side segments 113 of the first unit 11 of the base seat 1, extend in the second direction (D2) through the first unit 11 into the second units 12 for positioning the second units 12 relative to the first unit 11, and are respectively disposed in the rod grooves 22 at the opposite outer sides of the slide seats 2 in the first direction (D1). As such, the limit rods 3 are slidable within the rod grooves 22 of the slide seats 2 and are able to arrest movement of the slide seats 2 when the slide seat 2 is moved to the outer position (i.e., the slide seats 2 are prevented from sliding out of the receiving space 111 of the base seat 1).

Figure 6:
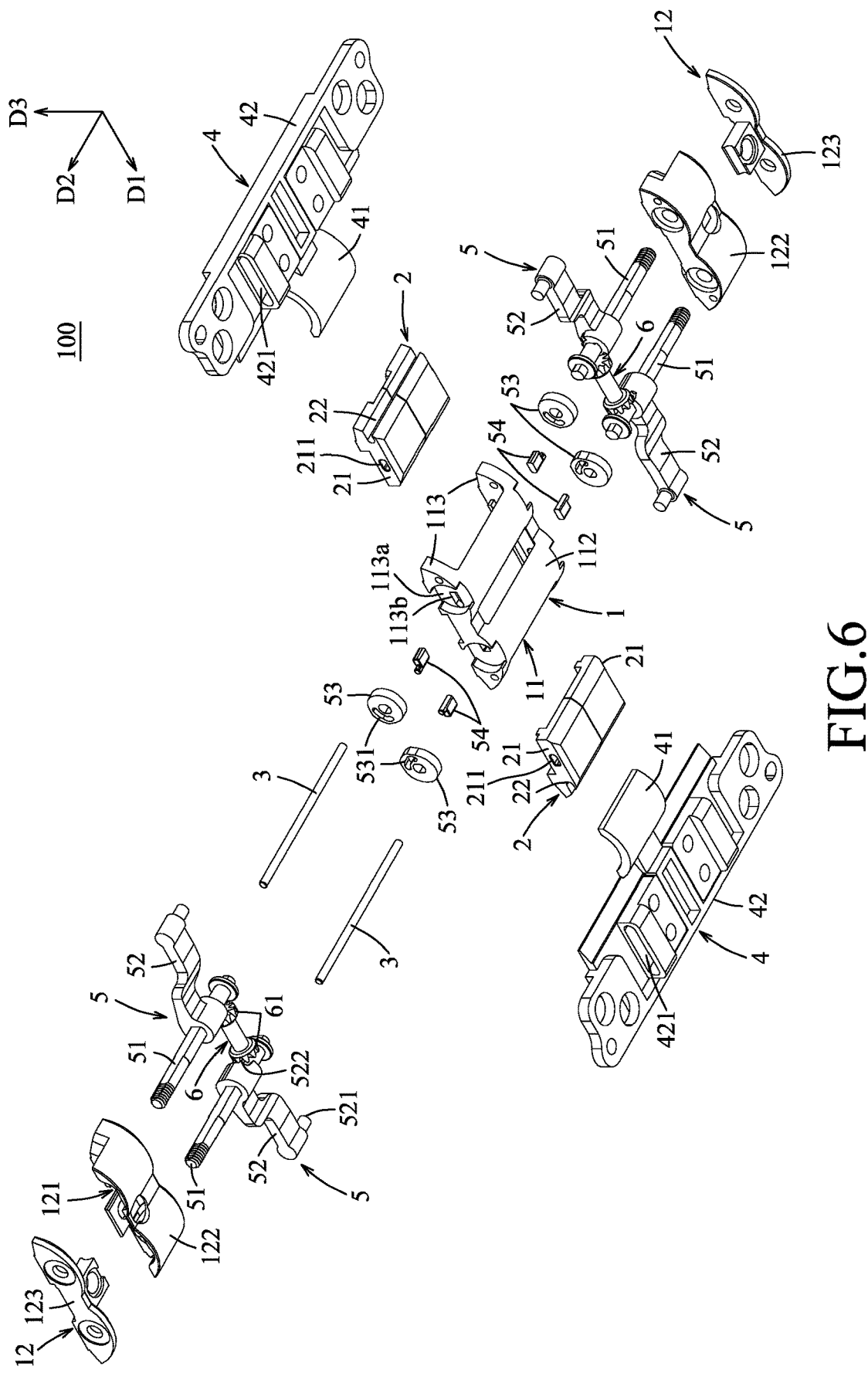
FIG. 6 is another fully exploded perspective view of the embodiment, based on FIG. 2.

Each of the rotary members 4 has a slide portion 41, and a mounting portion 42 that is connected to the slide portion 41 and that is formed with a slide groove 421 (see FIG. 6).

The slide portion 41 of each of the rotary members 4 is received in and in sliding contact with the slide rail portion 23 of a respective one of the slide seats 2 in a manner that the rotary members 4 are respectively rotatable relative to the slide seats 2, and are respectively rotatable about the rotary axes (A). The mounting portions 42 of the rotary members 4 are adapted to be respectively connected to two casings (not shown) of an electronic device that are foldable relative to each other and that are mounted with a flexible display (not shown). The electronic device may include, but not limited to, a foldable smartphone, a tablet, or a notebook computer.

The coupling mechanisms 5 are divided into two pairs; each pair is connected to a respective one of the rotary members 4 and a respective one of the slide seats 2. Specifically, the coupling mechanisms 5 of each pair are opposite to each other along the second direction (D2), are connected to the respective rotary member 4 and the respective slide seat 2, and are respectively disposed in the receiving slots 121 of the second units 12 of the base seat 1. By virtue of the disposition of the coupling mechanisms 5, rotations of the rotary members 4 are able to drive the slide seats 2 to move between the inner position and the outer position. It should be noted that, the number of the coupling mechanisms 5 is not limited to four; in variations of the embodiment, the hinge 100 may include only two of the coupling mechanisms 5 that are respectively connected to the rotary members 4, and are respectively connected to the slide seats 2.

In the present embodiment, each of the coupling mechanisms 5 includes a shaft member 51, a coupling member 52, a coupling wheel 53 and a coupling block 54.

The shaft member 51 of each coupling mechanism 5 extends in the second direction (D2), and extends rotatably into the corresponding one of the second units 12 of the base seat 1. The coupling member 52 of each coupling mechanism 5 is sleeved co-rotatably on the shaft member 51 of the same, and has a gear portion 522 that surrounds the shaft member 51, and a slide block 521 that is inserted into and slidable along the slide groove 421 of the corresponding one of the rotary members 4 such that the coupling member 52 interconnects the shaft member 51 and the corresponding one of the rotary members 4, and that movement of the rotary members 4 between the folded position and the unfolded position drives the coupling members 52 to rotate relative to the base seat 1.

The coupling wheel 53 of each coupling mechanism 5 is sleeved co-rotatably on the shaft member 51 of the same, is received in a respective one of the mounting slots 113*a* of the base seat 1, and is formed with a curved groove 531 that extends therethrough in the second direction (D2), and that has opposite first and second end sections 531*a*, 531*b*, and a transitioning section 531*c* disposed between the first and second end sections 531*a*, 531*b*.

It should be noted that, in every two coupling mechanisms 5 that are opposite to each other in the first direction (D1), the curved grooves 531 of the two coupling wheels 53 are disposed partially between the shaft members 51 (i.e., the curved grooves 531 of the coupling wheels 53 are disposed at inner sides of the shaft members 51) such that a minimum distance between the curved grooves 531 is smaller than a distance between the shaft members 51. It should also be noted that, in each coupling mechanism 5, a distance between a center axis of the shaft member 51 and the transitioning section 531*c* of the curved groove 531 is greater than a distance between the center axis of the shaft member 51 and the first or second end section 531*a*, 531*b* of the curved groove 531; that is, the transitioning section 531*c* of the curved groove 531 is disposed farther from the shaft member 51 than either one of the first end section 531*a* and the second end section 531*b*.

The coupling block 54 of each coupling mechanism 5 extends movably through a respective one of the through slots 113*b* of the base seat 1, and has one end that is inserted into and slidable along the curved groove 531 of the coupling wheel 53, and another end that is connected to the corresponding one of the slide seats 2 (via engagement with the block slot 211 of each of the guide protrusions 21). In such a manner, each of the coupling blocks 54 interconnects the respective one of the coupling wheels 53 with the corresponding one of the slide seats 2.

It should be noted that, the shaft member 51 and the coupling wheel 53 are not limited to be separate components as illustrated in the present embodiment; in variations of the embodiment, the coupling wheel 53 may be integrally formed as one piece with the shaft member 51. Similarly, the coupling block 54 and the slide seat 2 are not limited to be separate components, and may be integrally formed as one piece in variations of the embodiment.

It should also be noted that, the coupling mechanisms 5 are not limited to the present configurations as long as they are configured in manners that enable rotation of the rotary members 4 to drive the slide seats 2 to be moved between the inner and outer positions.

Each of the gear members 6 is received in the receiving slot 121 of a respective one of the second units 12 of the base seat 1, and is disposed between and meshes with the gear portions 522 of the coupling members 52 of two corresponding ones of the coupling mechanisms 5 that are opposite to each other in the first direction (D1) (i.e., one from each pair of the coupling mechanisms 5). Specifically, each of the gear members 6 includes two main gear portions 61 that respectively mesh with the gear portions 522 of the coupling members 52 of the two corresponding coupling mechanisms 5, so that the coupling members 52 of the coupling mechanisms 5 rotate synchronously during the movement of the rotary members 4 between the folded position and the unfolded position.

Referring to FIGS. 7 to 12, the rotary members 4 are respectively rotatable about the rotary axes (A) among a folded position (see FIG. 11), an unfolded position (see FIG. 7), and an intermediate position (see FIG. 9) between the folded position and the unfolded position. In the present embodiment, an angle formed between the rotary members 4 at the intermediate position is 150 degrees; however, the angle is not limited thereto and may vary in variations of the embodiment.

Figure 7:
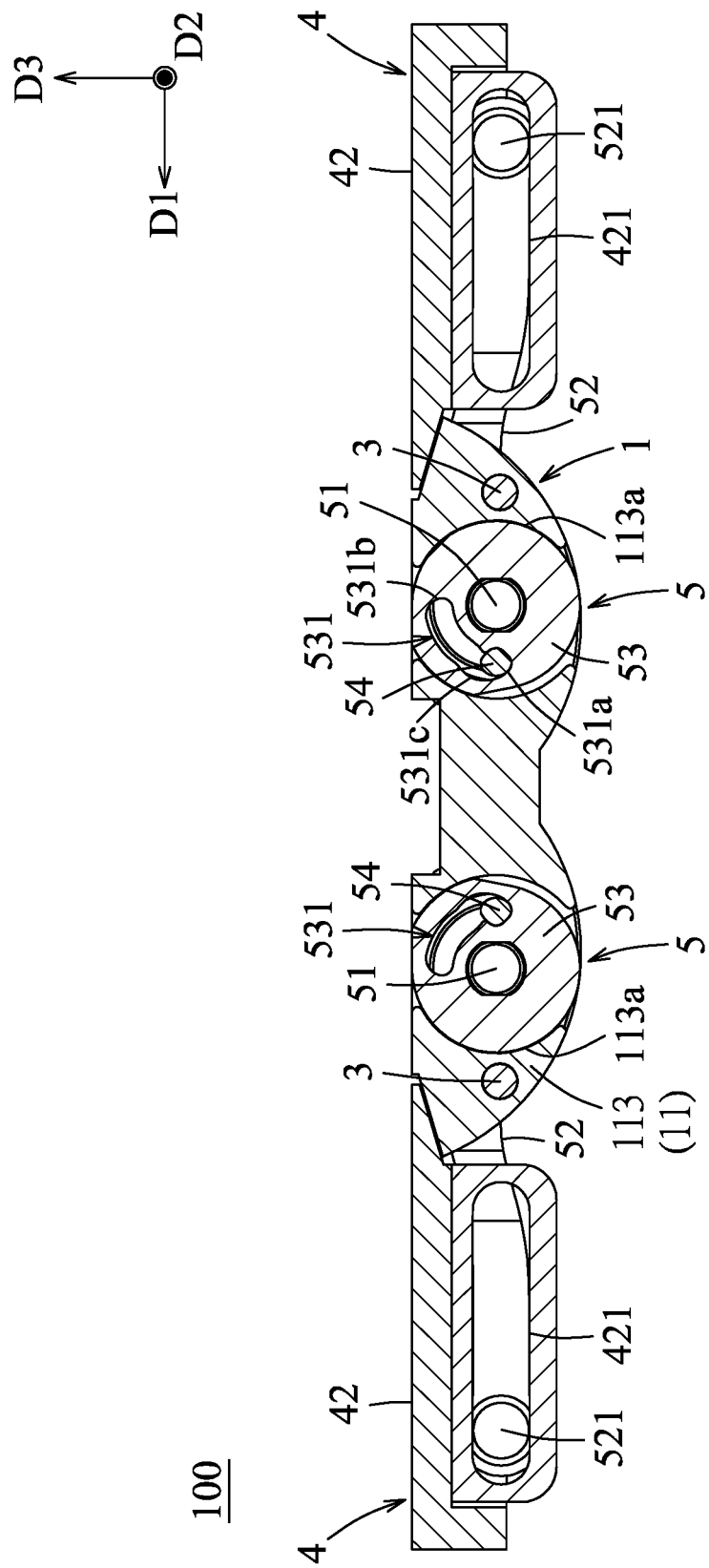
FIG. 7 is a cross-sectional view of the embodiment, illustrating a plurality of coupling mechanisms of the embodiment, with two rotary members of the embodiment at an unfolded position.
Figure 8:
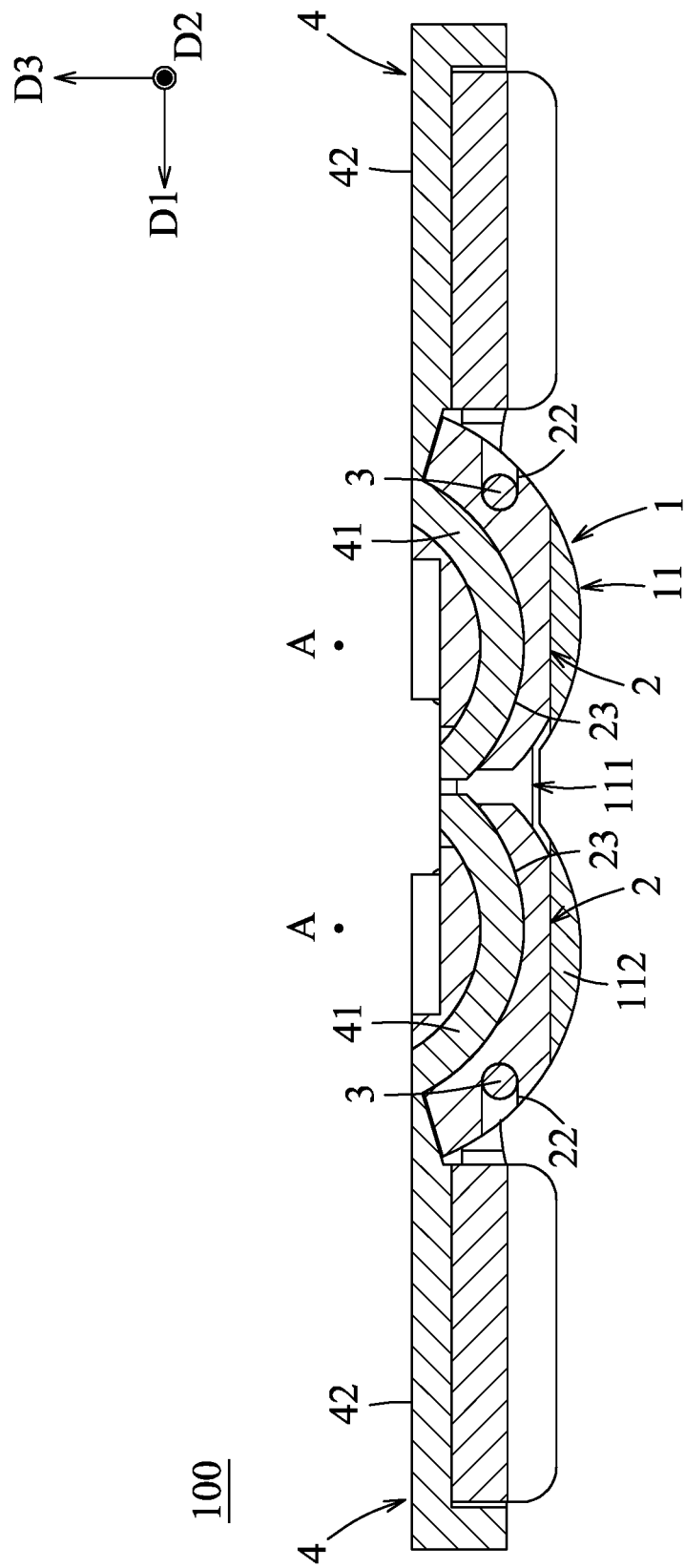
FIG. 8 is another cross-sectional view of the embodiment, illustrating two slide seats of the embodiment, with the rotary members at the unfolded position.

Specifically, when the rotary members 4 are at the unfolded position, as shown in FIGS. 7 and 8, the slide seats 2 are at the outer position, and the coupling block 54 of each of the coupling mechanisms 5 is disposed at the first end section 531a of the curved groove 531 of the respective coupling wheel 53. When the rotary members 4 are driven to move toward each other (i.e., when the casings of the electronic device (not shown) are being folded by a user), movement of the rotary members 4 from the unfolded position to the intermediate position drives the coupling members 52 and the coupling wheels 53 to co-rotate with the shaft members 51, which further drives the coupling blocks 54 to move relative to the coupling wheels 53 via the curved grooves 531 of the coupling wheel 53. During this process, since the curved groove 531 of each coupling wheel 53, as mentioned above, is disposed at the inner side of the respective shaft members 51, and since the transitioning section 531c of the curved groove 531 of each coupling wheel 53 is disposed farther from the respective shaft member 51 than either one of the first end section 531a and the second end section 531b, each coupling block 54 is driven to slide slightly toward an inner end of the respective through slot 113b of the base seat 1 when reaching the transitioning section 531c of the respective curved groove 531. As a result, the slide seats 2 are driven by the coupling blocks 54 to move from the outer position toward the inner position.

Figure 9:
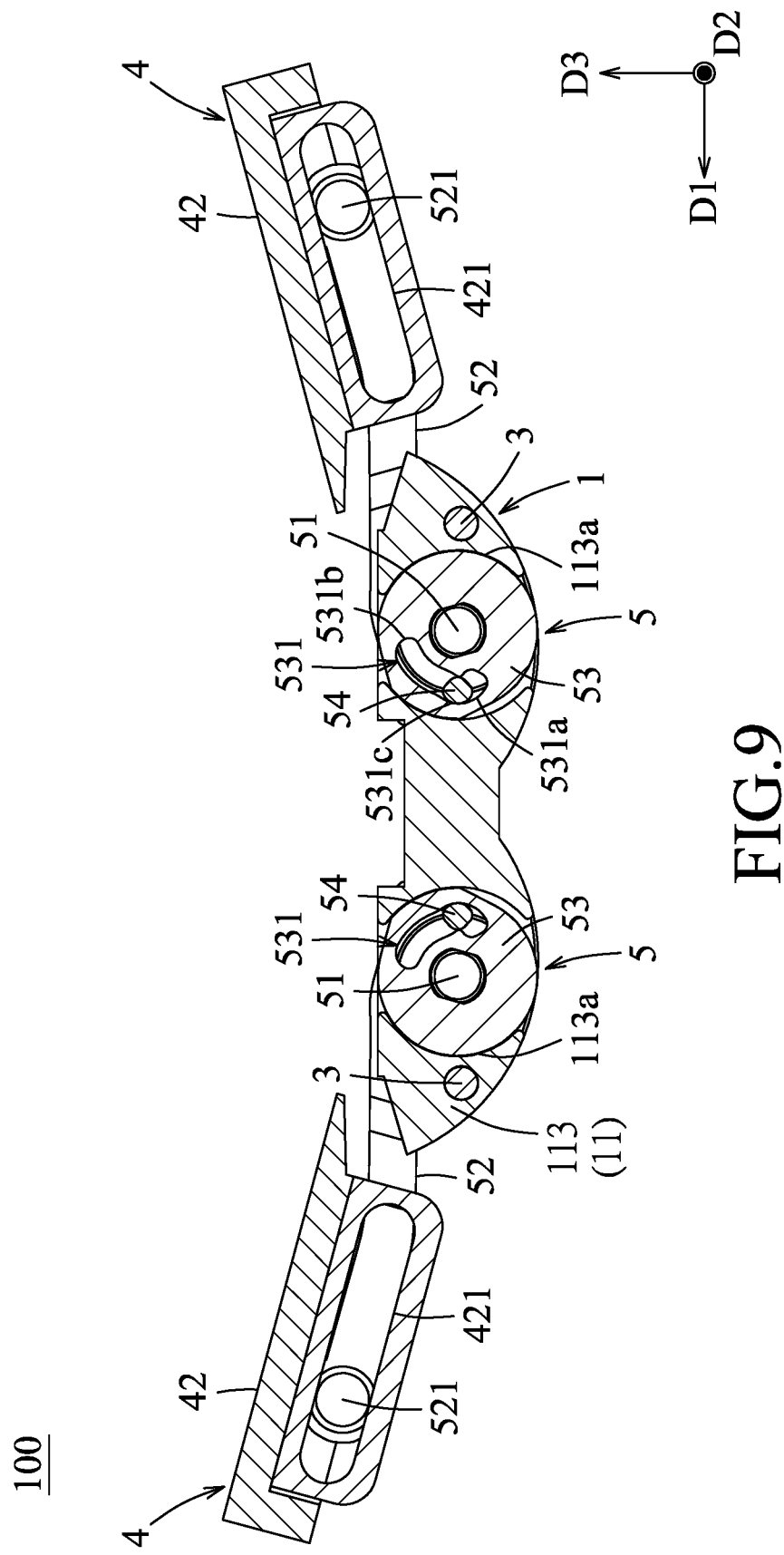
FIG. 9 is yet another cross-sectional view of the embodiment, illustrating the coupling mechanisms, with the rotary members at an intermediate position.
Figure 10:
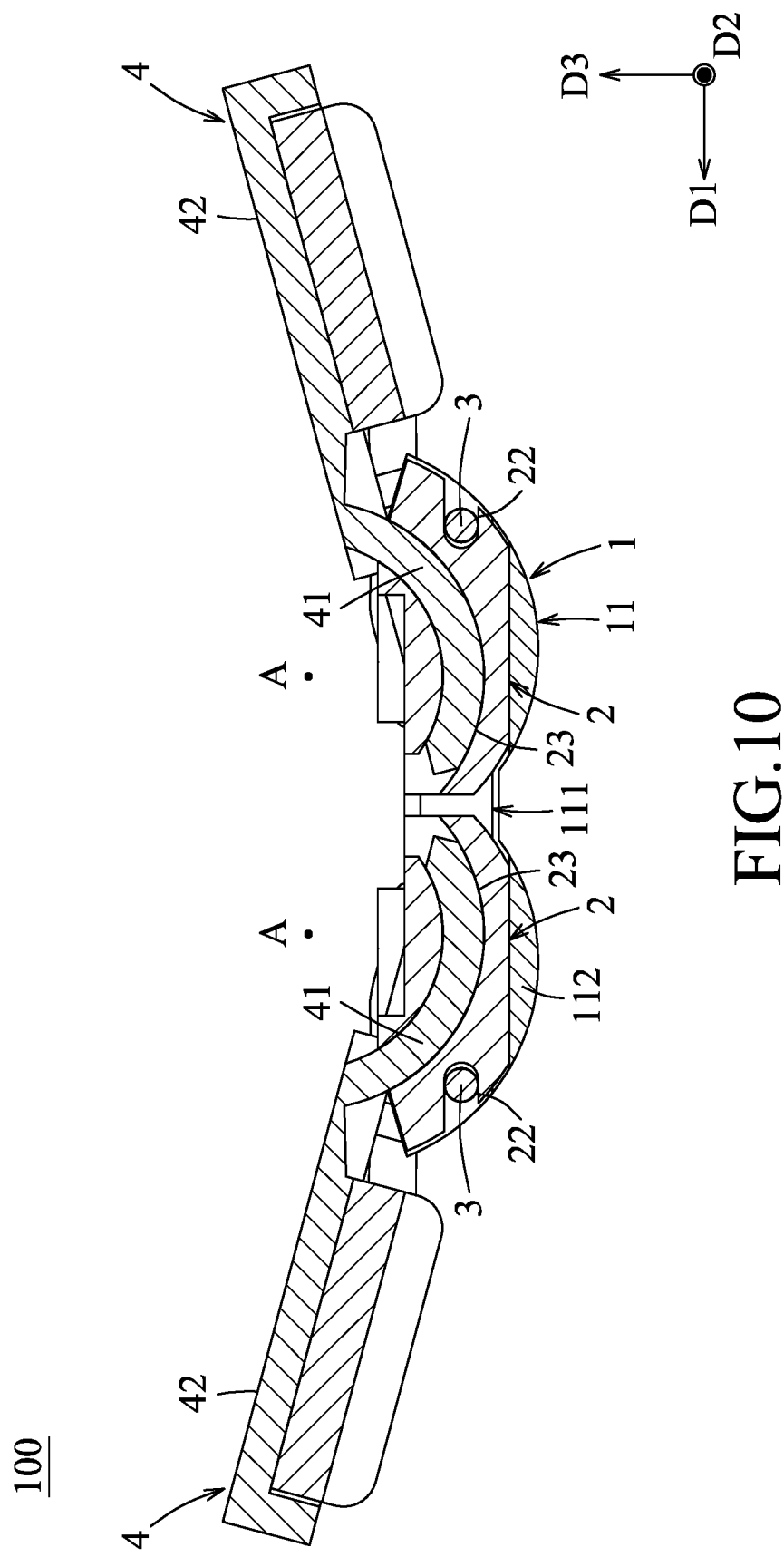
FIG. 10 is yet another cross-sectional view of the embodiment, illustrating the slide seats, with the rotary members at the intermediate position.

When the rotary members 4 arrive at the intermediate position, as shown in FIGS. 9 and 10, the slide seats 2 are at the inner position, and the coupling block 54 of each of the coupling mechanisms 5 is disposed at the transitioning section 531c of the curved groove 531 of the respective coupling wheel 53. If the rotary members 4 continues to be driven toward each other (i.e., toward the folded position), movement of the rotary members 4 from the intermediate position to the folded position continues to drive the co-rotation of the coupling members 52, the coupling wheels 53 and the shaft members 51. During this time, each coupling block 54, while moving from the transitioning section 531c of the curved groove 531 toward the second end section 531b, is driven to slide away from the inner end of the respective through slot 113b of the base seat 1, and the slide seats 2 are driven thereby to move from the inner position toward the outer position.

Figure 11:
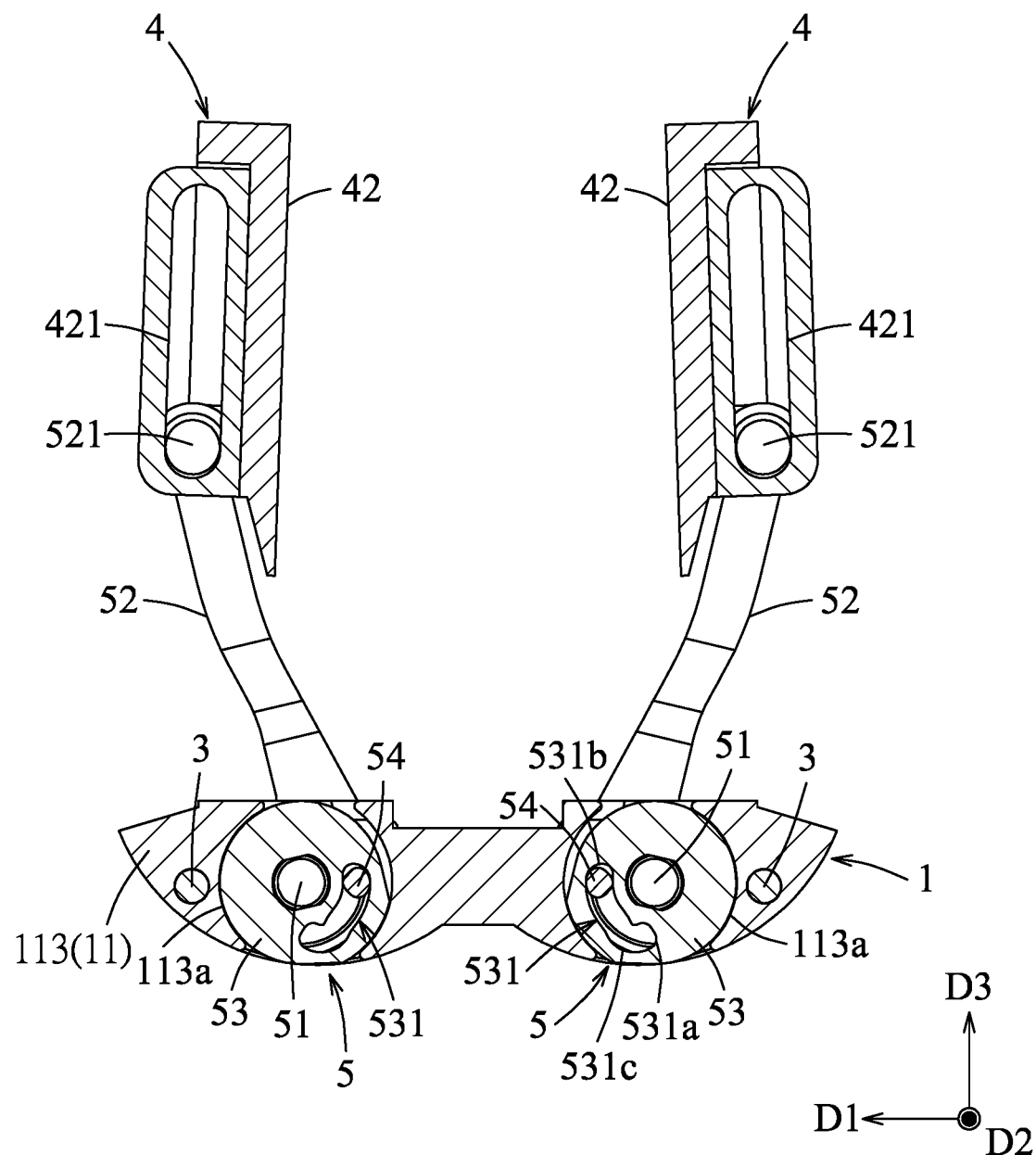
FIG. 11 is yet another cross-sectional view of the embodiment, illustrating the coupling mechanisms, with the rotary members at a folded position.
Figure 12:
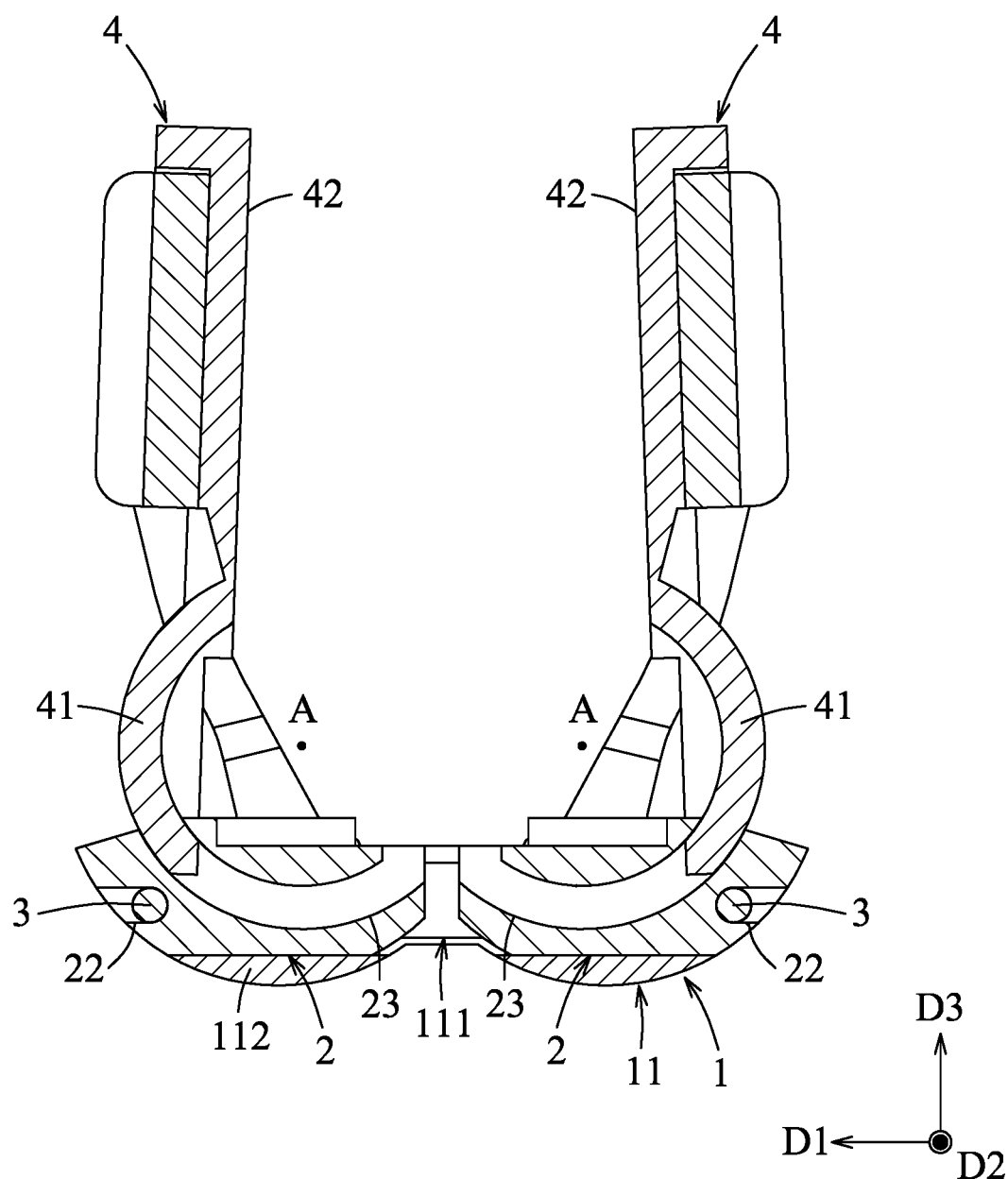
FIG. 12 is yet another cross-sectional view of the embodiment, illustrating the slide seats, with the rotary members at the folded position.

As such, when the rotary members 4 arrive at the folded position, as shown in FIGS. 11 and 12, the slide seats 2 are at the outer position again, and the coupling block 54 of each of the coupling mechanisms 5 is disposed at the second end section 531b of the curved groove 531 of the respective coupling wheel 53.

By virtue of the above-described movement of the slide seats 2, a distance between the slide seats 2 slightly decreases during a folding process of the casings of the electronic device (not shown), and the flexible display mounted to the casings is prevented from being stretched by the casings during the folding process.

It should be noted that, configurations of the slide seats 2 and the coupling mechanisms 5 are not limited to the present embodiment. Depending on actual requirements such as mechanical properties of the flexible display or curvature of the flexible display when folded, the configurations of the slide seats 2 and the coupling mechanisms 5 may be adapted in variations of the embodiment, so as to provide different moving patterns of the slide seats 2 or to further decrease the distance between the slide seats 2 during the folding process.

In sum, by virtue of the configurations and interrelated movements of the slide seats 2 and the coupling mechanisms 5, the present embodiment of the hinge 100 is able to prevent the flexible display of the electronic device from being stretched or compressed during the folding or unfolding process, thus reducing the possibility of damaging or of shortening the lifespan of the flexible display.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge comprising:
   a base seat;
   two slide seats mounted on said base seat and arranged along a first axis that extends in a first direction, said slide seats being movable relative to each other along the first axis between an inner position and an outer position, a distance between said slide seats when said slide seats are at the inner position being shorter than that when said slide seats are at the outer position, each slide seat having a slide rail portion that extends about a rotary axis, the rotary axes about which said slide rail portions of said slide seats respectively extend being parallel to each other in the first direction and extending in a second direction that is perpendicular to the first direction;

two rotary members, each having a slide portion that is in sliding contact with said slide rail portion of a respective one of said slide seats, said rotary members being respectively rotatable relative to said slide seats and being respectively rotatable about the rotary axes; and two pairs of coupling mechanisms connected respectively to said rotary members and connected respectively to said slide seats, such that rotations of said rotary members drive said slide seats to move between the inner position and the outer position.

2. The hinge as claimed in claim 1, wherein:

said rotary members are respectively rotatable about the rotary axes among a folded position, an unfolded position, and an intermediate position between the folded position and the unfolded position;

when said rotary members are at the unfolded position, said slide seats are at the outer position; and movement of said rotary members from the unfolded position to the intermediate position drives said slide seats to move, via said coupling mechanisms, from the outer position to the inner position.

3. The hinge as claimed in claim 2, wherein movement of said rotary members from the intermediate position to the folded position drives said slide seats to move, via said coupling mechanisms, from the inner position to the outer position.

4. The hinge as claimed in claim 1, wherein:

each coupling mechanism includes
- a shaft member extending in the second direction, and
- a coupling member interconnecting said shaft member and a respective one of said rotary members, such that movement of said rotary members between the folded position and the unfolded position drives said coupling members to rotate;

for each coupling mechanism, said shaft member is co-rotatable with said coupling member; and each coupling mechanism further includes
- a coupling wheel sleeved co-rotatably on said shaft member, and formed with a curved groove that extends therethrough in the second direction, and
- a coupling block having one end that is inserted into and slidable along said curved groove of said coupling wheel, and another end that is connected to the respective one of said slide seats.

5. The hinge as claimed in claim 4, wherein:

each rotary member further has a slide groove; and for each coupling mechanism, said coupling member is sleeved on said shaft member, and has a slide block inserted into and slidable along said slide groove of the respective one of said rotary members.

6. The hinge as claimed in claim 4, wherein:

for each coupling mechanism, said coupling member is sleeved on said shaft member and has a gear portion surrounding said shaft member; and said hinge further comprises a gear member disposed between and meshing with said gear portions of said coupling members of said coupling mechanisms so that said coupling members of said coupling mechanisms rotate synchronously during the movement of said rotary members between the folded position and the unfolded position.

7. The hinge as claimed in claim 1, wherein:

said base seat has a receiving space; and said slide seats are disposed movably in said receiving space.

8. The hinge as claimed in claim 7, wherein:

said base seat further has a guide recess being in spatial communication with said receiving space and elongated in the first direction; and each slide seat has a guide protrusion being elongated along a second axis that is parallel to the first axis, engaging said guide recess of said base seat, and slidable along the second axis.

9. The hinge as claimed in claim 7, wherein:

said base seat includes a base segment, and two side segments that are connected respectively to opposite ends of said base segment in the second direction, and that cooperate with said base segment to define said receiving space thereamong; and said hinge further comprises two limit rods that extend in the second direction, that are connected between said side segments of said base seat, and that are respectively disposed at opposite outer sides of said slide seats in the first direction for arresting movement of said slide seats when said slide seat is moved to the outer position.

10. The hinge as claimed in claim 9, wherein:

each slide seat further has a rod groove; and said limit rods are disposed respectively in said rod grooves of said slide seats.

* * * * *